(12) United States Patent
Foster

(10) Patent No.: US 12,292,535 B2
(45) Date of Patent: May 6, 2025

(54) METHOD AND SYSTEM FOR CALIBRATING A LIGHT-CURTAIN

(71) Applicant: Seegrid Corporation, Pittsburgh, PA (US)

(72) Inventor: Erich L. Foster, Pittsburgh, PA (US)

(73) Assignee: SEEGRID CORPORATION, Pittsburgh, PA (US)

( * ) Notice: Subject to any disclaimer, the term of this patent is extended or adjusted under 35 U.S.C. 154(b) by 0 days.

(21) Appl. No.: 18/503,451

(22) Filed: Nov. 7, 2023

(65) Prior Publication Data
US 2024/0151837 A1 May 9, 2024

Related U.S. Application Data

(60) Provisional application No. 63/423,538, filed on Nov. 8, 2022.

(51) Int. Cl.
*G01S 7/497* (2006.01)
*G05D 1/00* (2006.01)

(52) U.S. Cl.
CPC ............ *G01S 7/4972* (2013.01); *G05D 1/024* (2013.01)

(58) Field of Classification Search
CPC ...................................................... G01S 7/4972
See application file for complete search history.

(56) References Cited

U.S. PATENT DOCUMENTS

| | | | |
|---|---|---|---|
| 8,169,596 B2 | 5/2012 | Weiss et al. | |
| 2010/0256940 A1 | 10/2010 | Ogawa et al. | |
| 2011/0037963 A1 | 2/2011 | Weiss et al. | |
| 2021/0109205 A1* | 4/2021 | Liao | G01S 7/4811 |
| 2023/0204353 A1* | 6/2023 | Toom | G01C 9/06 356/139.1 |
| 2024/0085542 A1* | 3/2024 | Sliskovic | G01S 17/931 |

OTHER PUBLICATIONS

International Search Report and Written Opinion dated Mar. 14, 2024 issued in International Application No. PCT/US2023/078890.

* cited by examiner

*Primary Examiner* — Hyun D Park
(74) *Attorney, Agent, or Firm* — Onello & Mello, LLP

(57) ABSTRACT

A method of calibrating a light-curtain system of an autonomous mobile robot (AMR) is provided. The method includes providing a scanner set at a height above a ground surface and outputting a laser scanning beam downwardly reflect from at least one mirror; providing and/or determining initial mirror angles, mirror positions, and lidar height; calculating a lidar height from scanner data; determining a gradient vector as a byproduct of the lidar height calculating; adjusting mirror angles, mirror positions, and lidar height in a direction opposite of the gradient vector; assessing of the adjusted mirror angles, mirror positions, and lidar height are equal to or less than thresholds; and if so, storing the mirror angles, mirror positions, and lidar height and/or values representing a ground plane.

22 Claims, 6 Drawing Sheets

METHOD AND SYSTEM FOR CALIBRATING A LIGHT-CURTAIN

CROSS REFERENCE TO RELATED APPLICATIONS

The present application claims priority to U.S. Provisional Patent Appl. No. 63/423,538, filed on Nov. 8, 2022, which is incorporated herein by reference in its entirety.

The present application may be related to International Application No. PCT/US23/016556 filed on Mar. 28, 2023, entitled A Hybrid, Context-Aware Localization System For Ground Vehicles; International Application No. PCT/US23/016565 filed on Mar. 28, 2023, entitled Safety Field Switching Based On End Effector Conditions In Vehicles; International Application No. PCT/US23/016608 filed on Mar. 28, 2023, entitled Dense Data Registration From An Actuatable Vehicle Mounted Sensor; International Application No. PCT/U.S. Pat. No. 23,016,589, filed on Mar. 28, 2023, entitled Extrinsic Calibration Of A Vehicle-Mounted Sensor Using Natural Vehicle Features; International Application No. PCT/US23/016615, filed on Mar. 28, 2023, entitled Continuous And Discrete Estimation Of Payload Engagement/Disengagement Sensing; International Application No. PCT/US23/016617, filed on Mar. 28, 2023, entitled Passively Actuated Sensor System; International Application No. PCT/US23/016643, filed on Mar. 28, 2023, entitled Automated Identification Of Potential Obstructions In A Targeted Drop Zone; International Application No. PCT/US23/016641, filed on Mar. 28, 2023, entitled Localization of Horizontal Infrastructure Using Point Clouds; International Application No. PCT/US23/016591, filed on Mar. 28, 2023, entitled Robotic Vehicle Navigation With Dynamic Path Adjusting; International Application No. PCT/US23/016612, filed on Mar. 28, 2023, entitled Segmentation of Detected Objects Into Obstructions and Allowed Objects; International Application No. PCT/US23/016554, filed on Mar. 28, 2023, entitled Validating the Pose of a Robotic Vehicle That Allows It To Interact With An Object On Fixed Infrastructure; and International Application No. PCT/US23/016551, filed on Mar. 28, 2023, entitled A System for AMRs That Leverages Priors When Localizing and Manipulating Industrial Infrastructure; International Application No.: PCT/US23/024114, filed on Jun. 1, 2023, entitled System and Method for Generating Complex Runtime Path Networks from Incomplete Demonstration of Trained Activities; International Application No.: PCT/US23/023699, filed on May 26, 2023, entitled System and Method for Performing Interactions with Physical Objects Based on Fusion of Multiple Sensors; International Application No.: PCT/US23/024411, filed on Jun. 5, 2023, entitled Lane Grid Setup for Autonomous Mobile Robots (AMRs); U.S. Provisional Patent Appl. No. 63/410,355 filed on Sep. 27, 2022, entitled Dynamic, Deadlock-Free Hierarchical Spatial Mutexes Based on a Graph Network; U.S. Provisional Patent Appl. No. 63/423,679, filed Nov. 8, 2022, entitled System and Method for Definition of a Zone of Dynamic Behavior within a Continuum of Possible Actions and Structural Locations within the Same, U.S. Provisional Appl. No. 63/423,683, filed on Nov. 8, 2022, entitled System and Method for Optimized Traffic Flow Through Intersections with Conditional Convoying Based on Path Network Analysis; U.S. Provisional Appl. No. 63/430,184 filed on Dec. 5, 2022, entitled Just in Time Destination Definition and Route Planning; U.S. Provisional Appl. No. 63/430,190 filed on Dec. 5, 2022, entitled Configuring a System that Handles Uncertainty with Human and Logic Collaboration in a Material Flow Automation Solution; U.S. Provisional Appl. No. 63/430,182 filed on Dec. 5, 2022, entitled Composable Patterns of Material Flow Logic for the Automation of Movement; U.S. Provisional Appl. No. 63/430,174 filed on Dec. 5, 2022, entitled Process Centric User Configurable Step Framework for Composing Material Flow Automation; U.S. Provisional Appl. No. 63/430,195 filed on Dec. 5, 2022, entitled Generation of "Plain Language" Descriptions Summary of Automation Logic; U.S. Provisional Appl. No. 63/430,171 filed on Dec. 5, 2022, entitled Hybrid Autonomous System Enabling and Tracking Human Integration into Automated Material Flow; U.S. Provisional Appl. No. 63/430,180 filed on Dec. 5, 2022, entitled A System for Process Flow Templating and Duplication of Tasks Within Material Flow Automation; U.S. Provisional Appl. No. 63/430,200 filed on Dec. 5, 2022, entitled A Method for Abstracting Integrations Between Industrial Controls and Autonomous Mobile Robots (AMRs); and U.S. Provisional Appl. No. 63/430,170 filed on Dec. 5, 2022, entitled Visualization of Physical Space Robot Queuing Areas as Non Work Locations for Robotic Operations, each of which is incorporated herein by reference in its entirety.

The present application may be related to U.S. patent application Ser. No. 11/350,195, filed on Feb. 8, 2006, U.S. Pat. No. 7,466,766, Issued on Nov. 4, 2008, entitled Multidimensional Evidence Grids and System and Methods for Applying Same; U.S. patent application Ser. No. 12/263,983 filed on Nov. 3, 2008, U.S. Pat. No. 8,427,472, Issued on Apr. 23, 2013, entitled Multidimensional Evidence Grids and System and Methods for Applying Same; U.S. patent application Ser. No. 11/760,859, filed on Jun. 11, 2007, U.S. Pat. No. 7,880,637, Issued on Feb. 1, 2011, entitled Low-Profile Signal Device and Method For Providing Color-Coded Signals; U.S. patent application Ser. No. 12/361,300 filed on Jan. 28, 2009, U.S. Pat. No. 8,892,256, Issued on Nov. 18, 2014, entitled Methods For Real-Time and Near-Real Time Interactions With Robots That Service A Facility; U.S. patent application Ser. No. 12/361,441, filed on Jan. 28, 2009, U.S. Pat. No. 8,838,268, Issued on Sep. 16, 2014, entitled Service Robot And Method Of Operating Same; U.S. patent application Ser. No. 14/487,860, filed on Sep. 16, 2014, U.S. Pat. No. 9,603,499, Issued on Mar. 28, 2017, entitled Service Robot And Method Of Operating Same; U.S. patent application Ser. No. 12/361,379, filed on Jan. 28, 2009, U.S. Pat. No. 8,433,442, Issued on Apr. 30, 2013, entitled Methods For Repurposing Temporal-Spatial Information Collected By Service Robots; U.S. patent application Ser. No. 12/371,281, filed on Feb. 13, 2009, U.S. Pat. No. 8,755,936, Issued on Jun. 17, 2014, entitled Distributed Multi-Robot System; U.S. patent application Ser. No. 12/542,279, filed on Aug. 17, 2009, U.S. Pat. No. 8,169,596, Issued on May 1, 2012, entitled System And Method Using A Multi-Plane Curtain; U.S. patent application Ser. No. 13/460,096, filed on Apr. 30, 2012, U.S. Pat. No. 9,310,608, Issued on Apr. 12, 2016, entitled System And Method Using A Multi-Plane Curtain; U.S. patent application Ser. No. 15/096,748, filed on Apr. 12, 2016, U.S. Pat. No. 9,910,137, Issued on Mar. 6, 2018, entitled System and Method Using A Multi-Plane Curtain; U.S. patent application Ser. No. 13/530,876, filed on Jun. 22, 2012, U.S. Pat. No. 8,892,241, Issued on Nov. 18, 2014, entitled Robot-Enabled Case Picking; U.S. patent application Ser. No. 14/543,241, filed on Nov. 17, 2014, U.S. Pat. No. 9,592,961, Issued on Mar. 14, 2017, entitled Robot-Enabled Case Picking; U.S. patent application Ser. No. 13/168,639, filed on Jun. 24, 2011, U.S. Pat. No. 8,864,164, Issued on Oct. 21, 2014, entitled Tugger Attachment; US Design Patent Appl. 29/398,127, filed on Jul. 26, 2011, U.S. Pat. No. D680,142, Issued on Apr. 16, 2013, entitled Multi-Camera Head; US Design Patent Appl. 29/471,328, filed on Oct. 30, 2013, U.S. Pat. No. D730,847, Issued on Jun. 2, 2015, entitled Vehicle Interface Module; U.S. patent application Ser. No. 14/196,147, filed on Mar. 4, 2014, U.S. Pat. No. 9,965,856, Issued on May 8, 2018, entitled Ranging Cameras Using A Common Substrate; U.S. patent application Ser. No. 16/103,389, filed on Aug. 14, 2018, U.S. Pat. No. 11,292,498, Issued on Apr. 5, 2022, entitled Laterally Operating Payload Handling Device; U.S. patent application Ser. No. 17/712,660, filed on Apr. 4, 2022, US Publication Number 2022/0297734, Published on Sep. 22, 2022, entitled Laterally Operating Payload Handling Device; U.S. patent application Ser. No. 16/892,549, filed on Jun. 4, 2020, U.S.

U.S. Pat. No. 11,693,403, Issued on Jul. 4, 2023, entitled Dynamic Allocation And Coordination of Auto-Navigating Vehicles and Selectors; U.S. patent application Ser. No. 18/199,052, filed on May 18, 2023, Publication Number 2023-0376030, Published on Nov. 23, 2023, entitled Dynamic Allocation And Coordination of Auto-Navigating Vehicles and Selectors; U.S. patent application Ser. No. 17/163,973, filed on Feb. 1, 2021, US Publication Number 2021/0237596, Published on Aug. 5, 2021, entitled Vehicle Auto-Charging System and Method; U.S. patent application Ser. No. 17/197,516, filed on Mar. 10, 2021, US Publication Number 2021/0284198, Published on Sep. 16, 2021, entitled Self-Driving Vehicle Path Adaptation System and Method; U.S. patent application Ser. No. 17/490,345, filed on Sep. 30, 2021, US Publication Number 2022/0100195, Published on Mar. 31, 2022, entitled Vehicle Object-Engagement Scanning System And Method; U.S. patent application Ser. No. 17/478,338, filed on Sep. 17, 2021, US Publication Number 2022/0088980, Published on Mar. 24, 2022, entitled Mechanically-Adaptable Hitch Guide; U.S. patent application Ser. No. 29/832,212, filed on Mar. 25, 2022, entitled Mobile Robot, each of which is incorporated herein by reference in its entirety.

The present application may be related U.S. patent application Ser. No. 12/542,279, filed on Aug. 17, 2009, U.S. Pat. No. 8,169,596, Issued on May 1, 2012, entitled System And Method Using A Multiplane Curtain; U.S. patent application Ser. No. 13/460,096, filed on Apr. 30, 2012, U.S. Pat. No. 9,310,608, Issued on Apr. 12, 2016, entitled System And Method Using A Multiplane Curtain; U.S. patent application Ser. No. 15/096,748, filed on Apr. 12, 2016, U.S. Pat. No. 9,910,137, Issued on Mar. 6, 2018, entitled System and Method Using A Multiplane Curtain, each of which is incorporated herein by reference in its entirety.

FIELD OF INTEREST

The present inventive concepts relate to systems and methods in the field of autonomous mobile robots (AMRs), or robotic vehicles. Specifically, the present inventive concepts relate to calibrating a light-curtain system of robotic vehicle and/or AMR.

BACKGROUND

Some autonomous mobile robots (AMRs) are equipped with a planar scanning system used for obstruction detection and/or general safety. In such systems, a planar scanning system can downwardly project one or more scanning planes, i.e., toward a ground surface. A scanning plane or combination of scanning planes can be referred to as a "light curtain."

Some of these planar scanning systems include a support system, including a bracket and a mirror block. The bracket is configured to secure the system to the AMR and to maintain the mirror block in a fixed orientation with respect to at least one scanner. In some embodiments, the mirror block is arranged to receive a scanning signal from the scanner and to downwardly reflect the scanning signal into a plurality of directions to create multiple scanning planes forming a light curtain. The scanner can be a laser scanner, such as a lidar scanner.

Initial or subsequent calibration of the scanning system can be a challenge. For example, calibration can be performed using 3D laser scanning data from the scanning system, where the scanner data can be processed into point clouds. A point cloud is a set of data points in space that represent a 3D shape or object, typically in a 3D (x-y-z) coordinate system. When calibrating a light-curtain using volumetric calibration, a plane is fit to points observed by the scanner. Uncertainty in mirror angles and positions can cause calculated point cloud points to be at drastically different heights. A ground plane is then fit to the points and the differences in heights cause the ground plane angle to be inaccurate, which can ultimately lead to inaccuracies when detecting obstructions, such as detecting the ground as an obstruction. To address this problem of volumetric calibration, many times the volumetric calibration has to be turned off.

The method prior to volumetric calibration used the height of each point cloud point during calibration as a reference height and if, during operation, the height at a specific point was detected to be above or below the reference point to within some threshold, then this was considered to indicate an obstruction.

SUMMARY OF THE INVENTION

In accordance with one aspect of the inventive concepts, provided is a A light-curtain calibration method, comprising: providing an autonomous mobile robot (AMR) having a light-curtain generation system comprising a laser range scanner in fixed orientation relative to a scanner support having one or more surfaces arranged to downwardly reflect a beam from the scanner to generate one or more scanning planes; approximating and storing angles and positions of the one or more reflective surfaces and a scanner height above the ground plane; and determining calibrated values. Determining the calibrated values includes: generating one or more scanning planes and processing received scanner data: calculating a ground plane height and determining a gradient of the light-curtain system from the scanner data; and iteratively adjusting the stored values representing the angles and positions of the one or more reflective surfaces and the scanner height such that a solution travels in an opposite direction from the gradient until the ground plane height is within a tolerance value and/or the solution is below a threshold value.

In various embodiments, the AMR is a material transport vehicle.

In various embodiments, the laser range scanner is a lidar laser range scanner.

In various embodiments, the one or more surfaces of the scanner support comprises a plurality of reflective surfaces.

In various embodiments, determining the calibrated values further comprises establishing a common coordinate system for relating the stored values representing the angles and positions of the one or more reflective surfaces and the scanner height and/or the ground plane height.

In various embodiments, the common coordinate system is a cartesian coordinate system.

In various embodiments, approximating the angles and positions of the one or more reflective surfaces and a scanner height above the ground plane includes measuring and electronically storing angles and positions of the one or more reflective surfaces and a scanner height above the ground plane.

In various embodiments, determining the calibrated values further includes repeating the generating, calculating, and iteratively adjusting steps until the ground plane height is within the tolerance value.

In various embodiments, the tolerance value is zero.

In various embodiments, determining the calibrated values further includes repeating the generating, calculating, and iteratively adjusting steps until the solution is below the threshold value.

In various embodiments, the threshold value is $1 \times 10^{-6}$.

In various embodiments, calculating the ground plane height and determining the gradient of the light-curtain system from the scanner data is performed for each ray generated by the laser range scanner.

In various embodiments, the at least one mirror is a plurality of mirrors.

In accordance with another aspect of the inventive concepts, provided is a light-curtain calibration system, comprising: a laser range scanner in fixed orientation relative to a scanner support having one or more surfaces arranged to downwardly reflect a beam from the scanner to generate one or more scanning planes of an autonomous mobile robot (AMR); a computer memory having stored therein approximated angles and positions of the one or more reflective surfaces and a scanner height above the ground plane; and a light curtain processor configured to calibrate light-curtain system values. The light curtain processor is configured to: generate one or more scanning planes and process received scanner data; calculate a ground plane height and determine a gradient of the light-curtain system from the scanner data; and iteratively adjust the stored values representing the angles and positions of the one or more reflective surfaces and the scanner height such that a solution travels in an opposite direction from the gradient until the ground plane height is within a tolerance value and/or the solution is below a threshold value.

In various embodiments, the AMR is a material transport vehicle.

In various embodiments, the laser range scanner is a lidar laser range scanner.

In various embodiments, the one or more surfaces of the scanner support comprises a plurality of reflective surfaces.

In various embodiments, the light-curtain processor is further configured to determine the calibrated values within a common coordinate system that relates the stored values representing the angles and positions of the one or more reflective surfaces and the scanner height and/or the ground plane height.

In various embodiments, the common coordinate system is a cartesian coordinate system.

In various embodiments, the approximated angles and positions of the one or more reflective surfaces and a scanner height above the ground plane are measured and electronically stored values.

In various embodiments, the light-curtain processor is configured to repeat the generate, calculate, and iteratively adjust operations of claim 13 until the ground plane height is within the tolerance value.

In various embodiments, the tolerance value is zero.

In various embodiments, the light-curtain processor is configured to repeat the generate, calculate, and iteratively adjust operations of claim 13 until the solution is below the threshold value.

In various embodiments, the threshold value is $1 \times 10^{-6}$.

In various embodiments, the light-curtain processor is configured to calculate the ground plane height and determine the gradient of the light-curtain system from the scanner for each ray generated by the laser range scanner.

In accordance with another aspect of the inventive concepts, provided is an autonomous mobile robot (AMR) system, comprising: a drive system coupled to one or more object detection and safety systems; a laser range scanner in fixed orientation relative to a scanner support having one or more surfaces arranged to downwardly reflect a beam from the scanner to generate one or more scanning planes; a computer memory having stored therein approximated angles and positions of the one or more reflective surfaces and a scanner height above the ground plane; and a light curtain processor configured to calibrate light-curtain system values. The light curtain processor is configured: generate one or more scanning planes and process received scanner data; calculate a ground plane height and determine a gradient of the light-curtain system from the scanner data; and iteratively adjust the stored values representing the angles and positions of the one or more reflective surfaces and the scanner height such that a solution travels in an opposite direction from the gradient until the ground plane height is within a tolerance value and/or the solution is below a threshold value.

In various embodiments, the AMR is a material transport vehicle.

In various embodiments, the laser range scanner is a lidar laser range scanner.

In various embodiments, the one or more surfaces of the scanner support comprises a plurality of reflective surfaces.

In various embodiments, the light-curtain processor is further configured to determine the calibrated values within a common coordinate system that relates the stored values representing the angles and positions of the one or more reflective surfaces and the scanner height and/or the ground plane height.

In various embodiments, the common coordinate system is a cartesian coordinate system.

In various embodiments, the approximated angles and positions of the one or more reflective surfaces and the scanner height above the ground plane are measured and electronically stored values.

In various embodiments, the light-curtain processor is configured to repeat the generate, calculate, and iteratively adjust operations until the ground plane height is within the tolerance value.

In various embodiments, the tolerance value is zero.

In various embodiments, the light-curtain processor is configured to repeat the generate, calculate, and iteratively adjust operations until the solution is below the threshold value.

In various embodiments, the threshold value is $1 \times 10^{-6}$.

In various embodiments, the light-curtain processor is configured to calculate the ground plane height and determine the gradient of the light-curtain system from the scanner for each ray generated by the laser range scanner.

In various embodiments, the system further comprises a vertically extending mast wherein the scanner support and lidar are coupled to the mast.

In various embodiments, the scanner support and laser range scanner are coupled to the mast at least a few feet above.

In accordance with another aspect of the inventive concepts, provided is a computer program product comprising instructions stored on a computer-readable medium and executable to perform a light-curtain calibration method for a light-curtain generation system comprising a laser range scanner in fixed orientation relative to a scanner support having one or more surfaces arranged to downwardly reflect a beam from the scanner to generate one or more scanning planes. The method comprises approximating and storing angles and positions of the one or more reflective surfaces and a scanner height above the ground plane; and determining calibrated values, including: generating one or more scanning planes and processing received scanner data; calculating a ground plane height and determining a gradient of the light-curtain system from the scanner data; and iteratively adjusting the stored values representing the angles and positions of the one or more reflective surfaces and the scanner height such that a solution travels in an opposite direction from the gradient until the ground plane height is within a tolerance value and/or the solution is below a threshold value.

In various embodiments, the AMR is a material transport vehicle.

In various embodiments, the laser range scanner is a lidar laser range scanner.

In various embodiments, the one or more surfaces of the scanner support comprises a plurality of reflective surfaces.

In various embodiments, determining the calibrated values further comprises establishing a common coordinate system for relating the stored values representing the angles and positions of the one or more reflective surfaces and the scanner height and/or the ground plane height.

In various embodiments, the common coordinate system is a cartesian coordinate system.

In various embodiments, approximating the angles and positions of the one or more reflective surfaces and a scanner height above the ground plane includes measuring and electronically storing angles and positions of the one or more reflective surfaces and a scanner height above the ground plane.

In various embodiments, determining the calibrated values further includes repeating the generating, calculating, and iteratively adjusting steps until the ground plane height is within the tolerance value.

In various embodiments, the tolerance value is zero

In various embodiments, determining the calibrated values further includes repeating the generating, calculating, and iteratively adjusting steps until the solution is below the threshold value.

In various embodiments, the threshold value is $1 \times 10^{-6}$.

In various embodiments, calculating the ground plane height and determining the gradient of the light-curtain system from the scanner data is performed for each ray generated by the laser range scanner.

In accordance with aspects of the inventive concepts, provided is a light-curtain calibration method, comprising:
  a. providing a laser scanner in combination with at least one mirror on an autonomous mobile robot, the combination arranged to downwardly project a laser scanning beam toward a ground plane;
  b. approximating and recording angles and positions of the at least one mirror and a scanner height;
  c. outputting the laser scanning beam, receiving scanner data, and calculating a ground plane height from the scanner data;
  d. determining a gradient vector as a byproduct of the ground plane height;
  e. adjusting values of the angles and positions of the at least one mirror and the scanner height in a direction opposite of the gradient vector; and
  f. assessing whether the ground plane height is equal to or less than a tolerance or a change in the solution is below a threshold and if either is true, storing the adjusted angles and positions of the at least one mirror and the scanner height as true calibrated values, else repeating steps c. through f.

In various embodiments, the scanner comprises a lidar scanner.

In various embodiments, the at least one mirror is a plurality of mirrors.

In various embodiments, the at least one mirror is three mirrors.

In various embodiments, the method is performed onboard the autonomous mobile robot (AMR).

In various embodiments, the AMR is a material transport robotic vehicle.

In accordance with another aspect of the inventive concepts, provided is an automated mobile robot (AMR) comprising a light-curtain scanner processor configured to perform the calibration method.

In accordance with another aspect of the inventive concepts, provided is an automated mobile robot (AMR) comprising: a light-curtain system comprising a laser scanner set at a height above a ground plane and configured to output a laser scanning beam downwardly reflected from at least one mirror; and a light-curtain calibration system configured to:
  a. store approximate angles and positions of the at least one mirror and laser scanner height;
  b. calculate a ground plane height from scanner data;
  c. determine a gradient vector as a byproduct of calculating the ground plane height;
  d. adjust the angles and positions of the at least one mirror and the laser scanner height in a direction opposite of the gradient vector; and
  e. assess the ground plane height is equal to or less than a tolerance or a change in the solution is below a threshold and if either is true, store the adjusted angles and positions of the at least one mirror and the scanner height as true calibrated values, else repeat steps b. through e.

In various embodiments, the scanner comprises a lidar scanner.

In various embodiments, the at least one mirror is a plurality of mirrors.

In various embodiments, the at least one mirror is three mirrors.

In various embodiments, the method is performed onboard the autonomous mobile robot (AMR).

In various embodiments, the AMR is a material transport robotic vehicle.

In various embodiments, the AMR further comprises a controller coupled to the light-curtain system and a vehicle drive mechanism configured to control operation of the AMR in response to an object detection by the light-curtain system.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. In the drawings.

DESCRIPTION OF PREFERRED EMBODIMENT

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements may be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

To the extent that functional features, operations, and/or steps are described herein, or otherwise understood to be included within various embodiments of the inventive concepts, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

Figure 1:
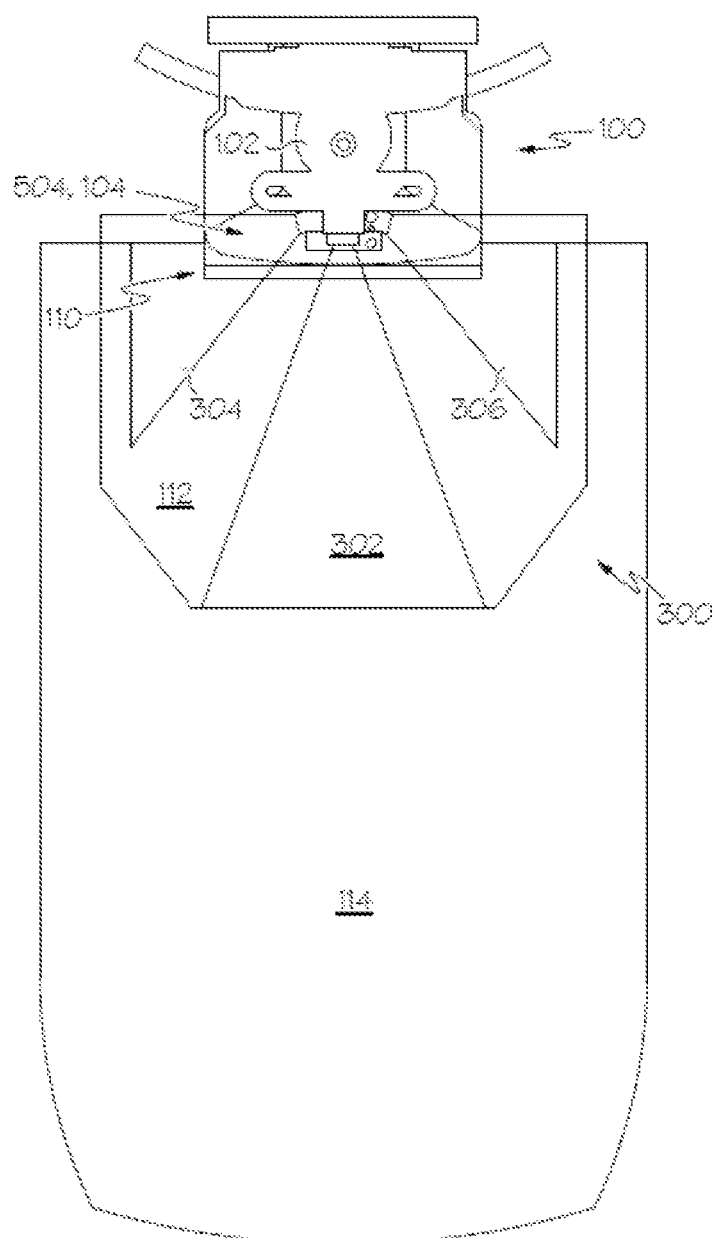
FIG. 1 is a top view of a robotic vehicle in the form of an autonomous mobile robot (AMR) with an embodiment of a multiplane light-curtain system, in accordance with aspects of the inventive concepts.
Figure 2:
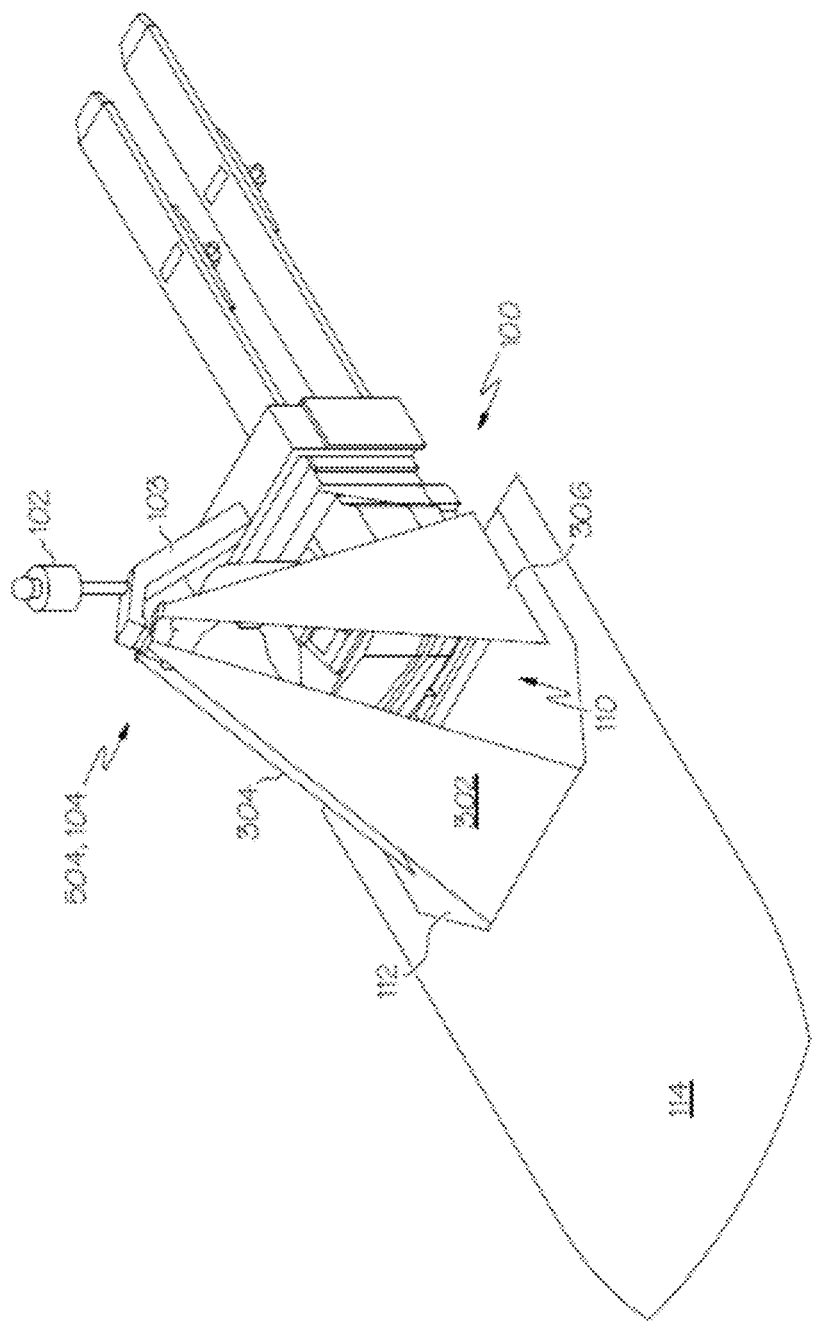
FIG. 2 is a perspective view of the AMR of FIG. 1, in accordance with aspects of the present invention.
Figure 3:
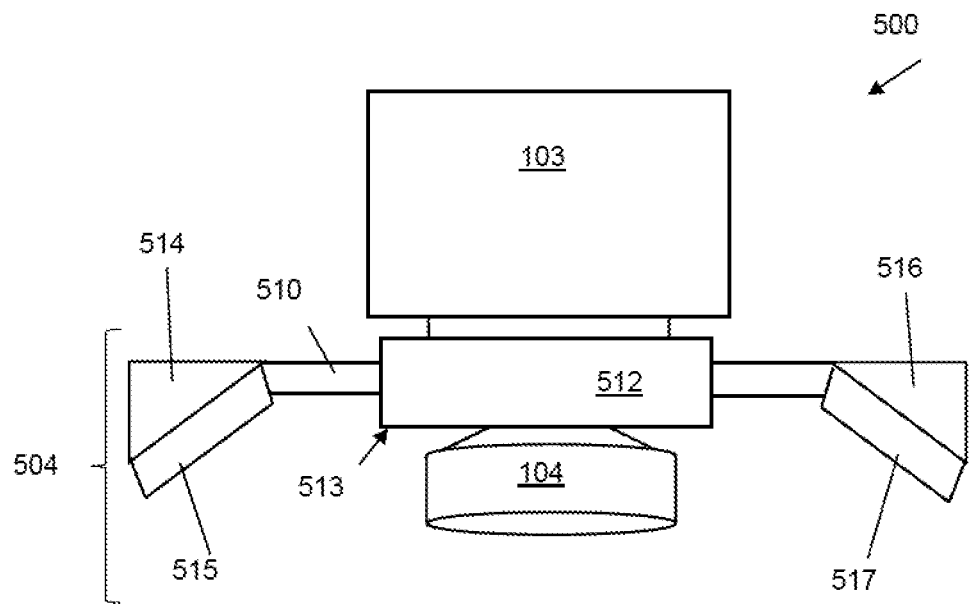
FIG. 3 is a top view of an embodiment of a multiplane scanner support and a scanner, in accordance with aspects of the present invention.
Figure 4:
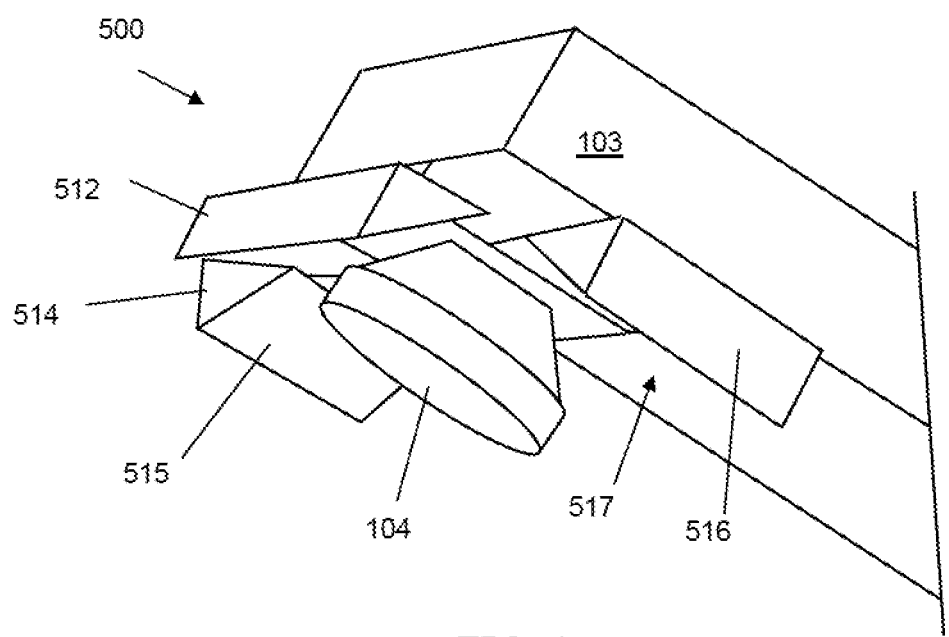
FIG. 4 is a perspective view of the multiplane scanner support and a scanner of FIG. 3, in accordance with aspects of the present invention.

FIG. 1 shows a top view of a robotic vehicle in the form of an autonomous mobile robot (AMR) 100, for example an AMR pallet lift or other material transport vehicle, which includes a light-curtain system 500, as seen in FIGS. 3-4. A light curtain is a set of downwardly projecting scanning planes. In various embodiments, the light-curtain system is a multiplane light-curtain system 500 includes a multiplane scanner support 504 and a scanner 104 combination mounted near a top of vehicle 100, in accordance with aspects of the present invention. FIG. 2 provides a perspective view of the same arrangement as that shown in FIG. 1. Light-curtain system 500 provides object detection and avoidance sensing used by the auto- or self-navigating vehicle, such as AMR 100.

Beyond light-curtain system 500, vehicle 100 can include other sensors and scanners 150 used for safety, object detection, navigation, and/or load engagement. In this embodiment, other safety scanning systems include a bottom laser range scanner 110 arranged to project a safety zone 112 and a warning zone 114. Bottom laser scanner 110 is mounted on or within a front portion of the vehicle 100 at a set height from a ground surface upon which the vehicle 100 travels. The bottom laser scanner 110 scans a laser beam in front of the AMR 100 to define the two zones, i.e., safety zone 112 and warning zone 114.

In some embodiments, if the bottom laser scanner 110 detects a body or object (collectively "body") in safety zone 112, AMR 100 can halt movement and/or operation. In some embodiments, when a body is detected in warning zone 114, AMR 100 can slow operation or otherwise alter navigation. In various embodiments, detection of a body in safety zone 112 or warning zone 114 could cause a visual warning signal and/or an audible alarm to be activated.

AMR 100 can include a vertically extending mast 103. A safety or warning light 102 can be mounted to or on mast 103, at least several feet or more above the ground surface to provide a readily viewably visual warning system to humans in the vicinity, e.g., when a body is detected in safety zone 112 or warning zone 114. In this embodiment, multiplane scanner support 504 and laser scanner 104 are also mounted to mast 103, preferably at or near a top of the mast to downwardly project one or more scanning planes. Laser scanners 104 and 110 may be lidar scanners.

Multiplane scanner support 504 and laser scanner 104 have a fixed arrangement with respect to each other, such that a light curtain 300 is generated from the single laser 104 through the reflective properties of the multiplane scanner support 504. In various embodiments, light curtain 300 includes a plurality of scanning planes. In various embodiments, such as that shown in FIGS. 1 and 2, light curtain 300 includes downwardly projecting scanning planes 302, 304, and 306.

Typical lidar scanners, such as laser scanner 104, scan a field of view that is restricted to a single plane, thereby possessing inherent field of view range limitations. Multiplane scanner support 504 overcomes such limitations by providing multiple reflective surfaces that redirect the scanning beam or ray of laser scanner 104 in predetermined directions and for predetermined portions of the scan field of view of laser scanner 104. More specifically, in various embodiments, one or more reflective surfaces of multiplane scanner support 504 receives the scanning beam of laser scanner 104 in different portions of its scan to create multiple scanning planes 302, 304, and 306. A practical benefit of such an approach with material transport vehicles is that it enables safety zone extension and detection to the front, right, and left areas of the vehicle. This can be extremely useful, for example, when an AMR is navigating around a corner—which is not covered by traditional safety zones.

In FIGS. 1 and 2, light curtain 300 comprises three relatively discrete scanning planes 302, 304 and 306, but in other embodiments a contoured light curtain can be formed using one or more contoured reflective surfaces forming part of or attached to multiplane scanner support 504. In such embodiments, for example, a single bent light curtain can be generated that comprises multiple scanning planes.

FIGS. 3-4 are different views of an embodiment of multiplane scanner support 504 and laser scanner 104 in fixed arrangement with respect to each other, in accordance with aspects of the inventive concepts. Multiplane scanner support 504 includes a bracket 510 that has laser scanner 104 disposed therein, so that reflective surfaces of the bracket 510 reflect the laser beam of laser scanner 104 during operation. In this embodiment, bracket 510 includes a plurality of mirror blocks 512, 514, 516. Each mirror block includes a reflective surface 513, 515, 517 that receives a scanning signal from laser scanner 104 and reflects the scan signal to form a respective scanning plane. For example, surface 513 reflects the laser scanning beam downwardly to form scanning plane 302, reflective surface 515 reflects the laser scanning beam downwardly to form scanning plane 304, and reflective surface 517 reflects the laser scanning beam downwardly to form scanning plane 306 in FIGS. 1 and 2. Collectively, these scanning planes form a multiplane light curtain.

Previous methods of calibration, e.g., non-volumetric methods, would allow for calibration with an obstruction in the field of view. This meant that it was possible, if not common, to have a bad calibration that prevented the AMR from operating until it was recalibrated. Newer methods of calibration, that is, methods of volumetric calibration, prevented calibration while obstructions were present. However, uncertainty in the elements of the light-curtain caused a calibrated ground plane to be skewed, thereby causing the ground surface to be processed as an obstruction in some instances. Methods in accordance with aspects of the present inventive concepts enable calibration of a light curtain system without the aforementioned issues.

The inventive concepts relate to a system and method including a multiplane light-curtain system comprising a lidar scanner and a multiplane scanner support having a plurality of reflective surfaces, e.g., three mirrors (port, starboard, and center). As the lidar spins, the light rays from the laser beam are deflected by the reflective surfaces towards the ground surface and, in FIGS. 1 through 4, at an angle relative the ground surface. The range obtained by the lidar, in combination with initial mirror angles, distance from lidar to mirrors, and an index of lidar ray (scanning beam) can all be used to calculate a cartesian coordinate of the ray's contact point with either the ground or an obstruction.

The inventive concepts further relate to a system and method for calibration of a light-curtain system. The system and method allow for more accurate localization of the ground surface plane (or ground plane). Uncertainties in mirror placement and angles can cause ground plane approximations (e.g., in height and angle) to not accurately represent reality. The system and method of calibration uses mathematical optimization to determine the mirror angles and placement such that the ground plane approximation is more representative of reality. In various embodiments, the method includes approximating or reading initial mirror angles and positions; calculating new mirror angles and positions via an optimization routine; and recording the new mirror angles and positions and using them as true mirror angles, mirror positions, and lidar height for operation. This process can be iterated until the measurements are within thresholds.

Figure 5:
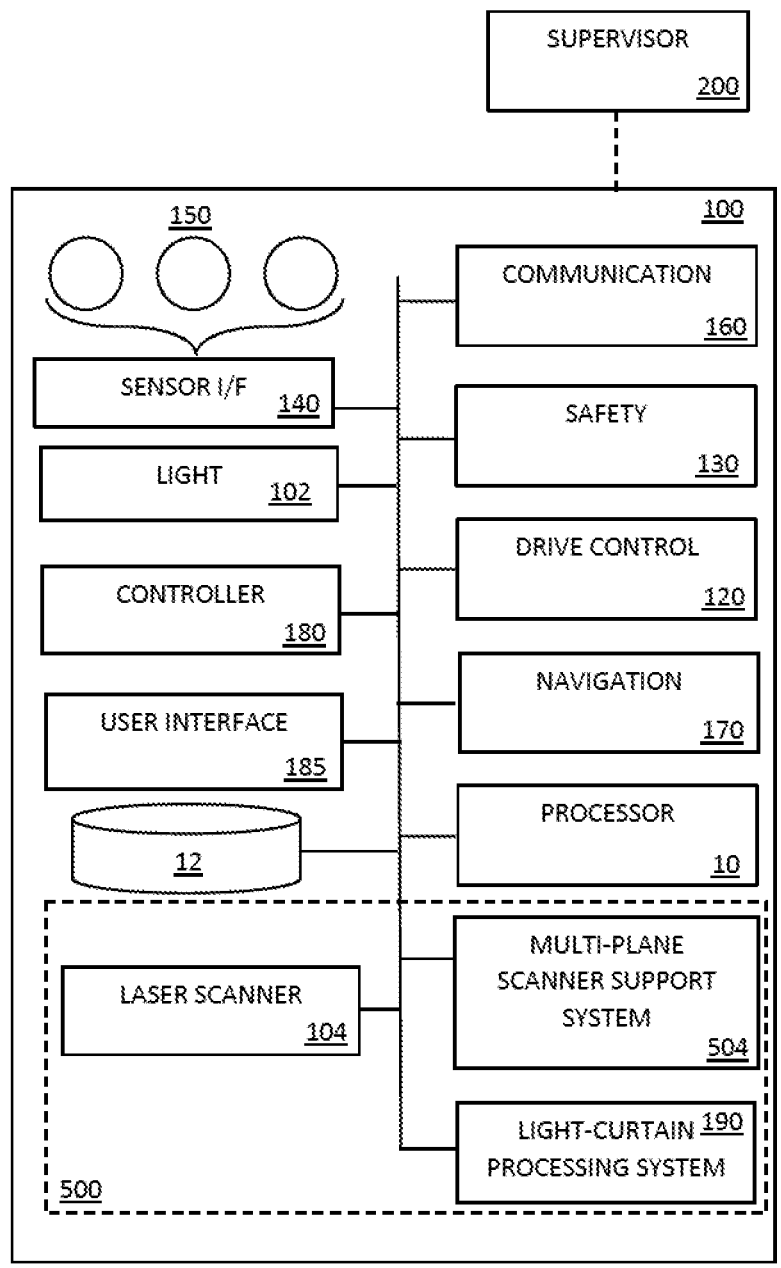
FIG. 5 is a block diagram of the AMR of FIG. 1, in accordance with aspects of inventive concepts.

FIG. 5 is a block diagram of components of an embodiment of a system incorporating technology for calibration of a light-curtain system employed in an AMR, in accordance with principles of inventive concepts. In the embodiment of FIG. 5, AMR 100 of FIGS. 1 and 2 is shown in communication with a supervisor system 200 (or "supervisor"). Supervisor 200 can be local or remote to the environment within which the robotic vehicle travels, or some combination of local and remote. The embodiment of FIG. 5 is an example, other embodiments of AMR 100 can include other components and/or use other terminology. In some embodiments, the environment is a warehouse environment and AMR 100 is a warehouse AMR 100.

In various embodiments, supervisor 200 can be or include a fleet management system, warehouse management system, or other system. In various embodiments, supervisor 200 could be configured to perform, for example, fleet management and monitoring for a plurality of robotic vehicles (e.g., a plurality of AMRs) and, optionally, other assets within the environment.

In various embodiments, supervisor 200 can be configured to provide instructions and data to AMR 100 and/or to monitor the navigation and activity of the robotic vehicle and, optionally, other AMRs. Supervisor 200 can include hardware, software, firmware, receivers and transmitters that enable communication with AMR 100 and any other internal or external systems over any now known or hereafter developed communication technology, such as various types of wireless technology including, but not limited to, WiFi, Bluetooth, cellular, global positioning system (GPS), radio frequency (RF), and so on. In various embodiments, supervisor 200 can monitor the AMR 100 and/or a plurality of vehicles, such as to determine robotic vehicle location within an environment, battery status and/or fuel level, and/or other operating, vehicle, performance, and/or load parameters.

As an example, supervisor 200 could wirelessly communicate a route to AMR 100 to enable the AMR to navigate within the environment to perform a task or series of tasks, wherein such tasks can include defined behaviors to be performed at one or more locations on the vehicle's route. In other embodiments, AMR 100 could receive the route by a different mechanism, e.g., downloaded through a wired or wireless connection or input at the vehicle through a user interface or digital port.

The route can be relative to a map of the environment stored in computer memory and, optionally, updated from time-to-time, e.g., in real-time, from vehicle sensor data collected in real-time by AMR 100 and/or other AMRs as they navigate and/or perform tasks. The sensor data can include sensor data collected from one or more of various sensors 150, at least some of which can be onboard AMR 100. As an example, in a warehouse setting, the route could include one or more stops for the picking, the dropping and/or the staging of goods. The route can include a plurality of route segments and navigation from one stop to another can comprise navigating one or more route segments.

As shown in FIG. 5, in example embodiments, the AMR 100 includes various functional elements, e.g., computer executable components and/or modules. In various embodiments, one or more of the functional elements or portions thereof can be maintained within or onboard the AMR 100. Such functional elements can include at least one processor 10 coupled to at least one memory 12 to cooperatively operate the robotic vehicle and execute its functions or tasks. Memory 12 can include computer program instructions, e.g., in the form of a computer program product and/or code executable by processor 10. Memory 12 can also store various types of data and information. Such data and information can include route data, route segment data, pick data, location data, environmental data, and/or sensor data, as examples, as well as an electronic map of the environment.

In this embodiment, processor 10 and memory 12 are shown onboard the AMR 100 of FIG. 5, but external (offboard) processors, memory, and/or computer program code could additionally or alternatively be provided to make up the functional elements. That is, in various embodiments, the processing and computer storage capabilities can be onboard, offboard, or some combination thereof. For example, some processor and/or memory functions could be distributed across supervisor 200, other vehicles, and/or other systems external to and in communication with AMR 100.

In various embodiments, the functional elements of AMR 100 can include a navigation module 170 configured to access environmental data, such as the electronic map, and route information stored in memory 12, as examples. Navigation module 170 can communicate instructions to a drive control subsystem 120 to cause the AMR 100 to navigate its route within the environment. During vehicle travel, the navigation module 170 may receive information from one or more sensors 150, via a sensor interface (UF) 140, to control and adjust the navigation of the AMR. For example, sensors 150 may provide 2D and/or 3D sensor data to the navigation module 170 and/or the drive control subsystem 120 in response to sensed objects and/or conditions in the environment to control and/or alter the vehicle's navigation. As examples, the sensors 150 can be configured to collect sensor data related to objects, obstructions, equipment, goods to be picked, hazards, completion of a task, and/or presence of humans and/or other vehicles.

A safety module 130 can be included and also make use of sensor data from one or more of the sensors 150, including laser scanners 104 and/or 110, to interrupt and/or take over control of the drive control subsystem 120 in accordance with applicable safety standard and practices, such as those recommended or dictated by the United States Occupational Safety and Health Administration (OSHA) for certain safety ratings. For example, if safety sensors, e.g., sensors 104 and/or 110, detect objects in the path as a safety hazard, such sensor data can be used to cause the drive control subsystem 120 to stop the vehicle to avoid the hazard.

AMR 100 can include a communication module 160 configured to enable communications with supervisor 200 and/or any other external systems. Communication module 160 can include hardware, software, firmware, receivers and transmitters that enable communication with supervisor 200 and any other internal or external systems over any now known or hereafter developed communication technology, such as various types of wireless technology including, but not limited to, WiFi, Bluetooth, cellular, global positioning system (GPS), radio frequency (RF), and so on.

The functional elements of the AMR 100 may also include a user interface (UI) module 185, which may be configured to process human operator inputs received via a user device, e.g., a pick or drop complete input at a stop on the route executed by the AMR 100. Other human inputs could also be accommodated, such as inputting map, route segments, lane grids, lanes, shared space marker information, and/or configuration information.

UI module 185 is shown onboard the AMR in FIG. 5, but in other embodiments it could be offboard or some combination of onboard and offboard. For example, some user interface module 185 functions could be distributed across supervisor 200, other vehicles, and/or other systems external to the AMR 100, such as a handheld device, kiosk, or other computer. In some embodiments, UI module 185 can reside on a handheld device that communicates with AMR 100 and/or supervisor 200.

The functional elements of AMR 100 may also include laser scanner 104 and multiplane scanner support 504 combination, as well as a controller 180, to which laser scanners 104 and 110 and light 102 are coupled. Controller 180 can be coupled to vehicle navigation module 170 and drive control subsystem 120, which control the navigation of the vehicle. The controller 180 can also be coupled to light 102.

If bottom laser scanner 110 detects a body or object (collectively "body") in safety zone 112, the scanner is configured to send a signal to controller 180, which in turn communicates to navigation module 170 and drive control subsystem 120 of the AMR 100. In response to receipt of a signal indicating detection of a body in safety zone 112, controller 180 can cause drive control subsystem 120 to halt movement and/or operation of AMR 100. Controller 180 can also cause light 102 to signal the presence of the condition. In this way, bottom laser scanner 110 can be useful for providing safety alerts relative to a body in front of AMR 100. In some embodiments, when a body is detected in warning zone 114, bottom laser scanner 110 can send a signal to controller 180. Controller 180, rather than halting operation, could cause drive control subsystem 120 to slow operation and could cause light 102 to communicate a warning signal. Such detections could also cause audible alarms to be activated.

Light-curtain system 500 may be operatively coupled to controller 180 to communicate with navigation module 170 and/or drive control subsystem 120 to halt or otherwise alter the navigation of vehicle 100 in response to an obstruction detected by any one or more of the light curtains 302, 304, 306.

To address and overcome calibration inaccuracies in prior systems, light-curtain system 500 includes a light-curtain calibration and processing system 190 (or "light-curtain processing system" 190), as part of the functional elements of the vehicle 100, which may be configured to calibrate the light-curtain. The light-curtain processing system 190 may include at least one processor 10 in communication with at least one computer storage device 12 comprising computer program code executable by the at least one processor.

Figure 6:
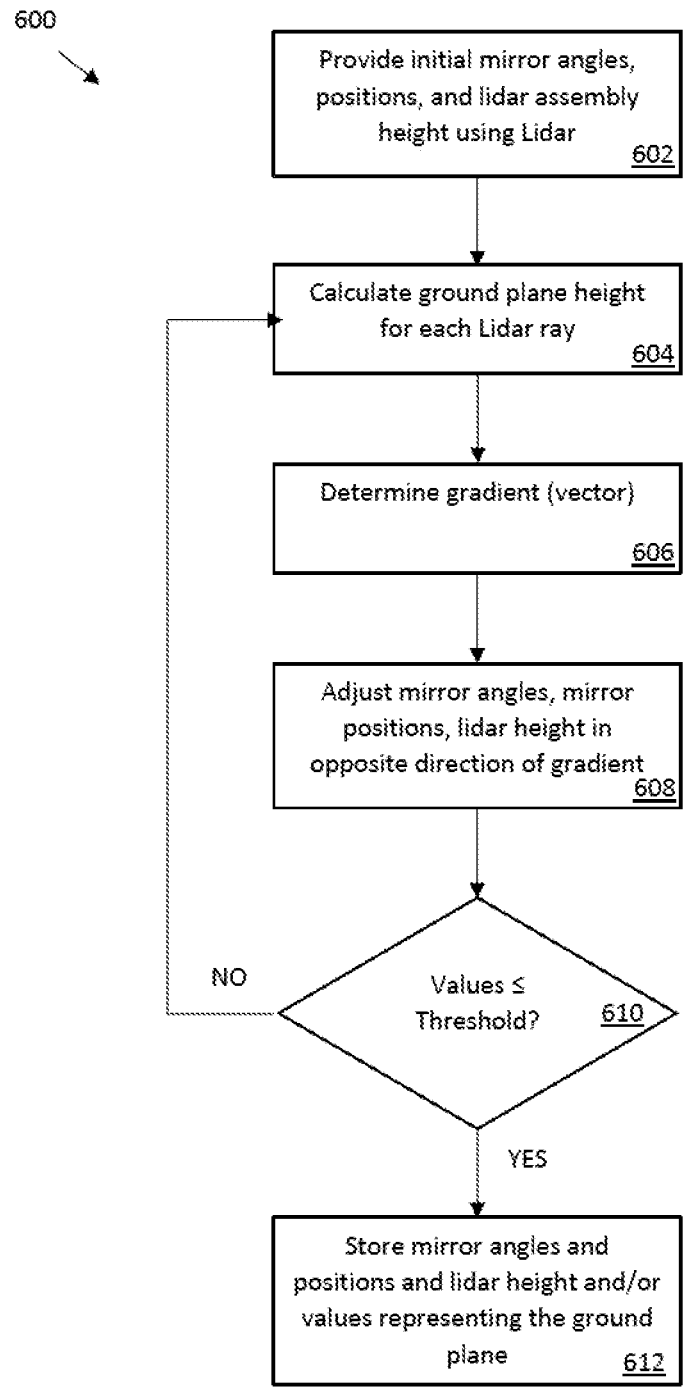
FIG. 6 is an embodiment of a method of calibrating a multiplane scanner system, in accordance with aspects of the inventive concepts.

FIG. 6 provides an embodiment of a method 600 of calibration of a light-curtain system, which can be executed by light-curtain processing system 190. In various embodiments, the method of calibration uses mathematical optimization to determine the mirror angles and placement, within predetermined thresholds, such that the ground plane approximation is more representative of reality and obstruction detection is more accurate. Embodiments of method 600 can include:
  1. Approximating or reading initial mirror angles, mirror positions, and height of LiDAR assembly, step 602.
  2. Determining or calculating a ground plane height for each reflected light ray, step 604.

3. While calculating the ground plane height, determining a gradient of the system, where the gradient is a vector having a magnitude and direction, step 606.
4. Iterating or adjusting the mirror angles, mirror positions, and height of LiDAR such that the solution travels in the opposite direction of the gradient, wherein the solution is the calculated mirror angles, positions, and heights, step 608.
5. Determining whether the calculated ground height and an ideal ground plane is within a threshold tolerance, step 610. The tolerance can be a zero tolerance in some embodiments.
6. Repeating steps 2-5 until the calculated ground height and an ideal ground plane is determined within a threshold tolerance or the change in the solution is below a threshold, step 610. The threshold can be $1\times10^{-6}$.
7. When the mirror angles, mirror positions, and lidar height are equal to or less than threshold, storing same and/or determining and storing values representing the ground plane as calibrated values, step 612.

Figure 7:
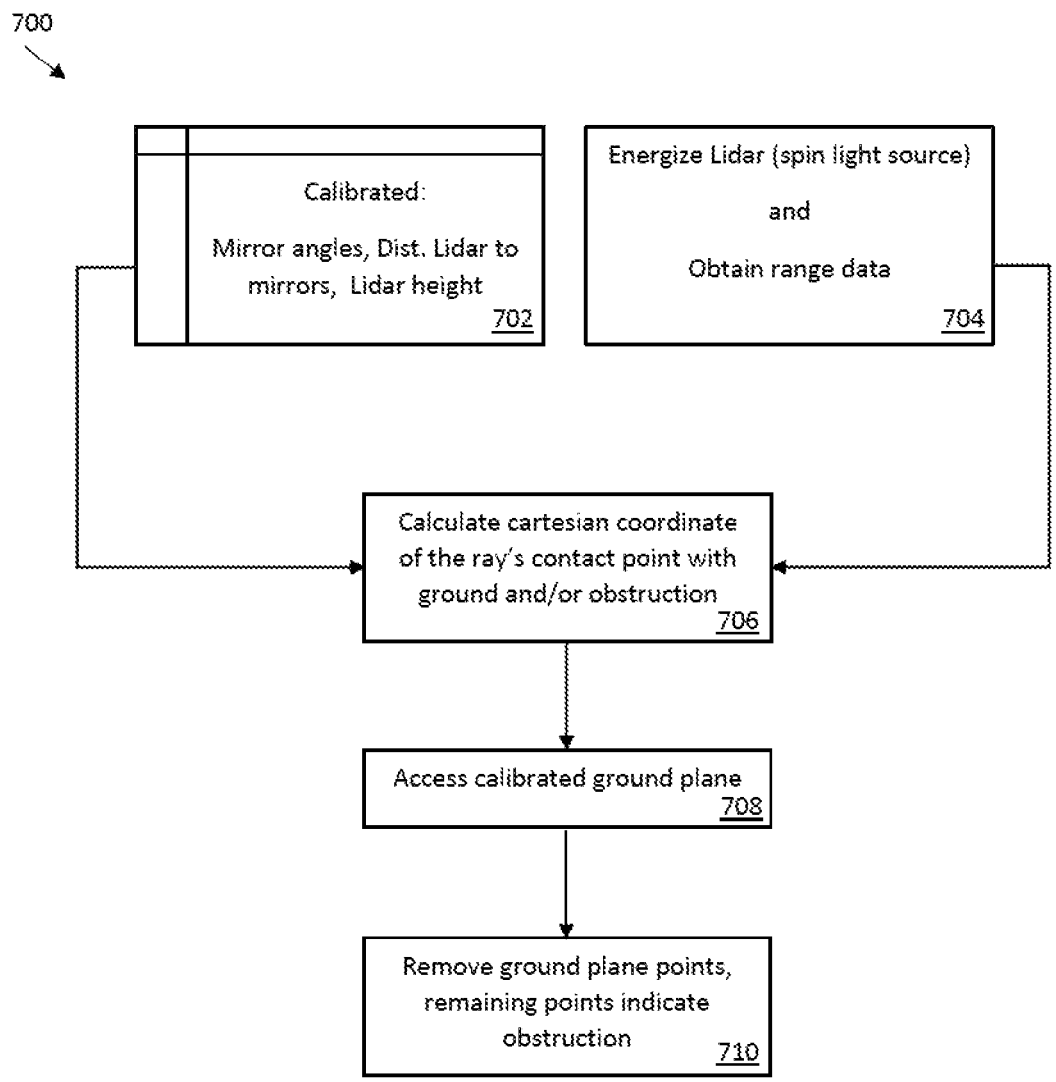
FIG. 7 is an embodiment of a method of calculating an obstruction with a multiplane scanner system using the calibrated values from the method of FIG. 6.

FIG. 7 is an embodiment of a method 700 of calculating an obstruction determined by light-curtain system 500 using the calibrated values from method 600 of FIG. 6. Method 700 can be performed by multiplane processing system 190. The calibrated mirror angles, distance to lidar and lidar height from the method 600 of FIG. 6 can be stored in memory 12 and used for obstruction detection, using a ground plane closer to real ground plane to avoid errors caused by an incorrectly determined ground plane, in 702.

In step 704, the lidar is energized and the multiplane scanning is started by lidar scanner 104 reflecting its scanning beam off of reflective surfaces of scanner support 504, and range data is obtained. In step 706, the reflected beam's rays contact points of the ground plane and an obstruction is determined in a cartesian coordinate system within which the ground plane lies. In step 708, the accurately determined ground plane from method 600 is accessed. In step 710, the ground plane points are removed from the collected range data and the remaining points, if any, indicate an obstruction, in step 710. If an obstruction is determined, multiplane scanner system 500 signals controller 180 to cause the vehicle 100 to stop or otherwise alter its navigation to avoid the obstruction and/or safety hazard.

In various embodiments, the scanners used herein, such as scanner 104, can be lidar scanners. Those skilled in the art will appreciate that various types of scanners can be used in different embodiments.

In various embodiments, the above methods can be used for any field that may combine a LiDAR and mirrors to deflect the laser that needs to be calibrated. The above methods can be used in any system with a light-curtain.

In some embodiments, a Point Cloud Library (PCL) and CERES-Solver can be used to implement the calibration. In some embodiments, the PCL and CERES-Solver are not used. In some embodiments, the systems and methods described herein do not use open-source software. In some embodiments, the systems and/or methods described herein can leverage several open-source libraries for various parts of the system/method being disclosed.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the inventive concepts, which are, for clarity, described in the context of separate embodiments, may also be provided in combination in a single embodiment. Conversely, various features of the inventive concepts which are, for brevity, described in the context of a single embodiment may also be provided separately or in any suitable sub-combination.

For example, it will be appreciated that all of the features set out in any of the claims (whether independent or dependent) can be combined in any given way.

Below follows an itemized list of statements describing embodiments in accordance with the inventive concepts:

A light-curtain calibration method, comprising:
providing an autonomous mobile robot (AMR) having a light-curtain generation system comprising a laser range scanner in fixed orientation relative to a scanner support having one or more surfaces arranged to downwardly reflect a beam from the scanner to generate one or more scanning planes;
approximating and storing angles and positions of the one or more reflective surfaces and a scanner height above the ground plane; and
determining calibrated values including:
generating one or more scanning planes and processing received scanner data:
calculating a ground plane height and determining a gradient of the light-curtain system from the scanner data; and
iteratively adjusting the stored values representing the angles and positions of the one or more reflective surfaces and the scanner height such that a solution travels in an opposite direction from the gradient until the ground plane height is within a tolerance value and/or the solution is below a threshold value.

2. The method of statement 1, or any other statement or combination of statements, wherein the AMR is a material transport vehicle.
3. The method of statement 1, or any other statement or combination of statements, wherein the laser range scanner is a lidar laser range scanner.
4. The method of statement 1, or any other statement or combination of statements, wherein the one or more surfaces of the scanner support comprises a plurality of reflective surfaces.
5. The method of statement 1, or any other statement or combination of statements, wherein determining the calibrated values further comprises establishing a common coordinate system for relating the stored values representing the angles and positions of the one or more reflective surfaces and the scanner height and/or the ground plane height.
6. The method of statement 5, or any other statement or combination of statements, wherein the common coordinate system is a cartesian coordinate system.
7. The method of statement 1, or any other statement or combination of statements, wherein approximating the angles and positions of the one or more reflective surfaces and a scanner height above the ground plane includes measuring and electronically storing angles and positions of the one or more reflective surfaces and a scanner height above the ground plane.
8. The method of statement 1, or any other statement or combination of statements, wherein determining the calibrated values further includes repeating the generating, calculating, and iteratively adjusting steps of statement 1 until the ground plane height is within the tolerance value.
9. The method of statement 1, or any other statement or combination of statements, wherein the tolerance value is zero.
10. The method of statement 1, or any other statement or combination of statements, wherein determining the calibrated values further includes repeating the generating, calculating, and iteratively adjusting steps of statement 1 until the solution is below the threshold value.
11. The method of statement 1, or any other statement or combination of statements, wherein the threshold value is $1\times10^{-6}$.
12. The method of statement 1, or any other statement or combination of statements, wherein calculating the ground plane height and determining the gradient of the light-curtain system from the scanner data is performed for each ray generated by the laser range scanner.
13. A light-curtain calibration system, comprising:
a laser range scanner in fixed orientation relative to a scanner support having one or more surfaces arranged to downwardly reflect a beam from the scanner to generate one or more scanning planes of an autonomous mobile robot (AMR);
a computer memory having stored therein approximated angles and positions of the one or more reflective surfaces and a scanner height above the ground plane; and
a light curtain processor configured to calibrate light-curtain system values, including:
generate one or more scanning planes and process received scanner data:
calculate a ground plane height and determine a gradient of the light-curtain system from the scanner data; and
iteratively adjust the stored values representing the angles and positions of the one or more reflective surfaces and the scanner height such that a solution travels in an opposite direction from the gradient until the ground plane height is within a tolerance value and/or the solution is below a threshold value.
14. The system of statement 13, or any other statement or combination of statements, wherein the AMR is a material transport vehicle.
15. The system of statement 13, or any other statement or combination of statements, wherein the laser range scanner is a lidar laser range scanner.
16. The system of statement 13, or any other statement or combination of statements, wherein the one or more surfaces of the scanner support comprises a plurality of reflective surfaces.
17. The system of statement 13, or any other statement or combination of statements, the light-curtain processor is further configured to determine the calibrated values within a common coordinate system that relates the stored values representing the angles and positions of the one or more reflective surfaces and the scanner height and/or the ground plane height.
18. The system of statement 17, or any other statement or combination of statements, wherein the common coordinate system is a cartesian coordinate system.
19. The system of statement 13, or any other statement or combination of statements, wherein the approximated angles and positions of the one or more reflective surfaces and a scanner height above the ground plane are measured and electronically stored values.
20. The system of statement 13, or any other statement or combination of statements, wherein the light-curtain processor is configured to repeat the generate, calculate, and iteratively adjust operations of statement 13 until the ground plane height is within the tolerance value.
21. The system of statement 13, or any other statement or combination of statements, wherein the tolerance value is zero.
22. The system of statement 13, or any other statement or combination of statements, wherein the light-curtain processor is configured to repeat the generate, calculate, and iteratively adjust operations of statement 13 until the solution is below the threshold value.
23. The system of statement 13, or any other statement or combination of statements, wherein the threshold value is $1\times10^{-6}$.
24. The system of statement 13, or any other statement or combination of statements, wherein the light-curtain processor is configured to calculate the ground plane height and determine the gradient of the light-curtain system from the scanner for each ray generated by the laser range scanner.
25. An autonomous mobile robot (AMR) system, comprising:
a drive system coupled to one or more object detection and safety systems;
a laser range scanner in fixed orientation relative to a scanner support having one or more surfaces arranged to downwardly reflect a beam from the scanner to generate one or more scanning planes;
a computer memory having stored therein approximated angles and positions of the one or more reflective surfaces and a scanner height above the ground plane; and
a light curtain processor configured to calibrate light-curtain system values, including:
generate one or more scanning planes and process received scanner data;
calculate a ground plane height and determine a gradient of the light-curtain system from the scanner data; and
iteratively adjust the stored values representing the angles and positions of the one or more reflective surfaces and the scanner height such that a solution travels in an opposite direction from the gradient until the ground plane height is within a tolerance value and/or the solution is below a threshold value.
26. The system of statement 25, or any other statement or combination of statements, wherein the AMR is a material transport vehicle.
27. The system of statement 25, or any other statement or combination of statements, wherein the laser range scanner is a lidar laser range scanner.
28. The system of statement 25, or any other statement or combination of statements, wherein the one or more surfaces of the scanner support comprises a plurality of reflective surfaces.
29. The system of statement 25, or any other statement or combination of statements, the light-curtain processor is further configured to determine the calibrated values within a common coordinate system that relates the stored values representing the angles and positions of the one or more reflective surfaces and the scanner height and/or the ground plane height.

30. The system of statement 29, or any other statement or combination of statements, wherein the common coordinate system is a cartesian coordinate system.

31. The system of statement 25, or any other statement or combination of statements, wherein the approximated angles and positions of the one or more reflective surfaces and the scanner height above the ground plane are measured and electronically stored values.

32. The system of statement 25, or any other statement or combination of statements, wherein the light-curtain processor is configured to repeat the generate, calculate, and iteratively adjust operations of statement 25 until the ground plane height is within the tolerance value.

33. The system of statement 25, or any other statement or combination of statements, wherein the tolerance value is zero.

34. The system of statement 25, or any other statement or combination of statements, wherein the light-curtain processor is configured to repeat the generate, calculate, and iteratively adjust operations of statement 25 until the solution is below the threshold value.

35. The system of statement 25, or any other statement or combination of statements, wherein the threshold value is $1\times10^{-6}$.

36. The system of statement 25, or any other statement or combination of statements, wherein the light-curtain processor is configured to calculate the ground plane height and determine the gradient of the light-curtain system from the scanner for each ray generated by the laser range scanner.

37. The system of statement 25, or any other statement or combination of statements, further comprising a vertically extending mast wherein the scanner support and lidar are coupled to the mast.

38. The system of statement 37, or any other statement or combination of statements, wherein the scanner support and the laser range scanner are coupled to the mast at least a few feet above.

39. A computer program product comprising instructions stored on a computer-readable medium and executable to perform a light-curtain calibration method for a light-curtain generation system comprising a laser range scanner in fixed orientation relative to a scanner support having one or more surfaces arranged to downwardly reflect a beam from the scanner to generate one or more scanning planes, the method comprising:
approximating and storing angles and positions of the one or more reflective surfaces and a scanner height above the ground plane; and
determining calibrated values including:
generating one or more scanning planes and processing received scanner data;
calculating a ground plane height and determining a gradient of the light-curtain system from the scanner data; and
iteratively adjusting the stored values representing the angles and positions of the one or more reflective surfaces and the scanner height such that a solution travels in an opposite direction from the gradient until the ground plane height is within a tolerance value and/or the solution is below a threshold value.

40. The computer program product of statement 39, or any other statement or combination of statements, wherein the AMR is a material transport vehicle.

41. The computer program product of statement 39, or any other statement or combination of statements, wherein the laser range scanner is a lidar laser range scanner.

42. The computer program product of statement 39, or any other statement or combination of statements, wherein the one or more surfaces of the scanner support comprises a plurality of reflective surfaces.

43. The computer program product of statement 39, or any other statement or combination of statements, wherein determining the calibrated values further comprises establishing a common coordinate system for relating the stored values representing the angles and positions of the one or more reflective surfaces and the scanner height and/or the ground plane height.

44. The computer program product of statement 43, or any other statement or combination of statements, wherein the common coordinate system is a cartesian coordinate system.

45. The computer program product of statement 39, or any other statement or combination of statements, wherein approximating the angles and positions of the one or more reflective surfaces and a scanner height above the ground plane includes measuring and electronically storing angles and positions of the one or more reflective surfaces and a scanner height above the ground plane.

46. The computer program product of statement 39, or any other statement or combination of statements, wherein determining the calibrated values further includes repeating the generating, calculating, and iteratively adjusting steps of statement 39 until the ground plane height is within the tolerance value.

47. The computer program product of statement 39, or any other statement or combination of statements, wherein the tolerance value is zero.

48. The computer program product of statement 39, or any other statement or combination of statements, wherein determining the calibrated values further includes repeating the generating, calculating, and iteratively adjusting steps of statement 39 until the solution is below the threshold value.

49. The computer program product of statement 39, or any other statement or combination of statements, wherein the threshold value is $1\times10^{-6}$.

50. The computer program product of statement 39, or any other statement or combination of statements, wherein calculating the ground plane height and determining the gradient of the light-curtain system from the scanner data is performed for each ray generated by the laser range scanner.

51. A light-curtain calibration method, comprising:
a. providing a laser scanner in combination with at least one mirror on an autonomous mobile robot, the combination arranged to downwardly project a laser scanning beam toward a ground plane;
b. approximating and recording angles and positions of the at least one mirror and a scanner height;
c. outputting the laser scanning beam, receiving scanner data, and calculating a ground plane height from the scanner data;
d. determining a gradient vector as a byproduct of the ground plane height;

e. adjusting values of the angles and positions of the at least one mirror and the scanner height in a direction opposite of the gradient vector; and f. assessing whether the ground plane height is equal to or less than a tolerance or a change in the solution is below a threshold and if either is true, storing the adjusted angles and positions of the at least one mirror and the scanner height as true calibrated values, else repeating steps c. through f.

52. The method of statement 51, or any other statement or combination of statements, wherein the scanner comprises a lidar scanner.

53. The method of statement 51, or any other statement or combination of statements, wherein the at least one mirror is a plurality of mirrors.

54. The method of statement 53, or any other statement or combination of statements, wherein the at least one mirror is three mirrors.

55. The method of statement 51, or any other statement or combination of statements, wherein the method is performed onboard the autonomous mobile robot (AMR).

56. The method of statement 55, or any other statement or combination of statements, wherein the AMR is a material transport robotic vehicle.

57. An automated mobile robot (AMR) comprising a light-curtain scanner processor configured to perform the calibration method of any of statements 51 through 56.

58. An automated mobile robot (AMR) comprising:
a light-curtain system comprising a laser scanner set at a height above a ground plane and configured to output a laser scanning beam downwardly reflected from at least one mirror; and
a light-curtain calibration system configured to:
a. store approximate angles and positions of the at least one mirror and laser scanner height;
b. calculate a ground plane height from scanner data;
c. determine a gradient vector as a byproduct of calculating the ground plane height;
d. adjust the angles and positions of the at least one mirror and the laser scanner height in a direction opposite of the gradient vector; and
e. assess the ground plane height is equal to or less than a tolerance or a change in the solution is below a threshold and if either is true, store the adjusted angles and positions of the at least one mirror and the scanner height as true calibrated values, else repeat steps b. through e.

59. The AMR of statement 58, or any other statement or combination of statements, wherein the scanner comprises a lidar scanner.

60. The AMR of statement 58, or any other statement or combination of statements, wherein the at least one mirror is a plurality of mirrors.

61. The AMR of statement 58, or any other statement or combination of statements, wherein the at least one mirror is three mirrors.

62. The AMR of statement 58, or any other statement or combination of statements, wherein the method is performed onboard the autonomous mobile robot (AMR).

What is claimed is:

1. A light-curtain calibration method for an autonomous mobile robot (AMR), comprising:

an AMR having a light-curtain generation system comprising a laser range scanner in fixed orientation relative to a scanner support;
the scanner support having one or more surfaces arranged to downwardly reflect a beam from the scanner to generate one or more scanning planes
and a processor, wherein the processor approximates and stores angles and positions of the one or more reflective surfaces and a scanner height above the ground plane; and
the processor determines calibrated values including:
generating one or more scanning planes and processing received scanner data:
calculating a ground plane height and determining the gradient of a cost function associated with the angles and positions of the one or more reflective surfaces and the scanner height from the scanner data;
iteratively adjusting the stored values representing the angles and positions of the one or more reflective surfaces and the scanner height in a direction that follows the steepest descent of the cost function until the change in the cost function is within a tolerance value to thereby determine calibrated values; and
the AMR employing the calibrated values during operation to determine whether an object is detected, continuing operation unchanged if no object is detected, and modifying operation if the object is detected by the light curtain using the calibrated values, wherein modifying operation comprises slowing, stopping, or otherwise altering navigation of the AMR.

2. The method of claim 1, wherein the AMR is a material transport vehicle and the laser range scanner is a lidar laser range scanner.

3. The method of claim 1, wherein determining the calibrated values further comprises establishing a common coordinate system for relating the stored values representing the angles and positions of the one or more reflective surfaces and the scanner height and/or the ground plane height.

4. The method of claim 1, wherein approximating the angles and positions of the one or more reflective surfaces and a scanner height above the ground plane includes measuring and electronically storing angles and positions of the one or more reflective surfaces and a scanner height above the ground plane.

5. The method of claim 1, wherein determining the calibrated values further includes repeating the generating, calculating, and iteratively adjusting steps of claim 1 until the ground plane height is within the tolerance value.

6. The method of claim 1, wherein determining the calibrated values further includes repeating the generating, calculating, and iteratively adjusting steps of claim 1 until the approximated angles, the approximated scanner height, and the approximated positions are below the threshold value, wherein the threshold value is $1 \times 10^{-6}$.

7. The method of claim 1, wherein calculating the ground plane height and determining the gradient of the light-curtain system from the scanner data is performed for each ray generated by the laser range scanner.

8. An AMR light-curtain calibration system, comprising:
a laser range scanner in fixed orientation relative to a scanner support having one or more surfaces arranged to downwardly reflect a beam from the scanner to generate one or more scanning planes of an autonomous mobile robot (AMR);

a computer memory having stored therein approximated angles and positions of the one or more reflective surfaces and a scanner height above the ground plane; and a light curtain processor configured to calibrate light-curtain system values, including:
- generating one or more scanning planes and process received scanner data:
- calculating a ground plane height and determining a gradient of a cost function associated with the angles and positions of the one or more reflective surfaces and the scanner height from the scanner data;
- iteratively adjust the stored values representing the angles and positions of the one or more reflective surfaces and the scanner height in a direction that follows the steepest descent of the cost function until the change in the cost function is within a tolerance value to thereby determine calibrated values; and
- the AMR employing the calibrated values during operation to determine whether an object is detected, continuing operation unchanged if no object is detected, and modifying operation if the object is detected by the light curtain using the calibrated values, wherein modifying operation comprises slowing, stopping, or otherwise altering navigation of the AMR.

9. The system of claim 8, wherein the AMR is a material transport vehicle and the laser range scanner is a lidar laser range scanner.

10. The system of claim 8, the light-curtain processor is further configured to determine the calibrated values within a common coordinate system that relates the stored values representing the angles and positions of the one or more reflective surfaces and the scanner height and/or the ground plane height.

11. The system of claim 8, wherein the approximated angles and positions of the one or more reflective surfaces and a scanner height above the ground plane are measured and electronically stored values.

12. The system of claim 8, wherein the light-curtain processor is configured to repeat the generate, calculate, and iteratively adjust operations of claim 8 until the ground plane height is within the tolerance value.

13. The system of claim 8, wherein the light-curtain processor is configured to repeat the generate, calculate, and iteratively adjust operations of claim 8 until the approximated angles, the approximated scanner height, and the approximated positions are below the threshold value, wherein the threshold value is $1 \times 10^{-6}$.

14. The system of claim 8, wherein the light-curtain processor is configured to calculate the ground plane height and determine the gradient of the light-curtain system from the scanner for each ray generated by the laser range scanner.

15. An autonomous mobile robot (AMR) system, comprising:
- a drive system coupled to one or more object detection and safety systems;
- a laser range scanner in fixed orientation relative to a scanner support having one or more surfaces arranged to downwardly reflect a beam from the scanner to generate one or more scanning planes;
- a computer memory having stored therein approximated angles and positions of the one or more reflective surfaces and a scanner height above the ground plane; and
- a light curtain processor configured to calibrate light-curtain system values, including:
  - generating one or more scanning planes and process received scanner data;
  - calculating a ground plane height and determining a gradient of a cost function associated with the angles and positions of the one or more reflective surfaces and the scanner height from the scanner data;
  - iteratively adjust the stored values representing the angles and positions of the one or more reflective surfaces and the scanner in a direction that follows the steepest descent of the cost function until the change in the cost function is within a tolerance value to thereby determine calibrated values; and
  - the AMR employing the calibrated values during operation to determine whether an object is detected, continuing operation unchanged if no object is detected, and modifying operation if the object is detected by the light curtain using the calibrated values, wherein modifying operation comprises slowing, stopping, or otherwise altering navigation of the AMR.

16. The system of claim 15, wherein the AMR is a material transport vehicle and the laser range scanner is a lidar laser range scanner.

17. The system of claim 15, the light-curtain processor is further configured to determine the calibrated values within a common coordinate system that relates the stored values representing the angles and positions of the one or more reflective surfaces and the scanner height and/or the ground plane height.

18. The system of claim 15, wherein the approximated angles and positions of the one or more reflective surfaces and the scanner height above the ground plane are measured and electronically stored values.

19. The system of claim 15, wherein the light-curtain processor is configured to repeat the generate, calculate, and iteratively adjust operations of claim 15 until the ground plane height is within the tolerance value.

20. The system of claim 15, wherein the light-curtain processor is configured to repeat the generate, calculate, and iteratively adjust operations of claim 15 until the approximated angles, the approximated scanner height, and the approximated positions are below the threshold value, wherein the threshold value is $1 \times 10^{-6}$.

21. The system of claim 15, wherein the light-curtain processor is configured to calculate the ground plane height and determine the gradient of the light-curtain system from the scanner for each ray generated by the laser range scanner.

22. The system of claim 15, further comprising a vertically extending mast, wherein the scanner support and the lidar are coupled to the mast at least a few feet above.

* * * * *

UNITED STATES PATENT AND TRADEMARK OFFICE
CERTIFICATE OF CORRECTION

PATENT NO. : 12,292,535 B2
APPLICATION NO. : 18/503451
DATED : May 6, 2025
INVENTOR(S) : Erich L. Foster Page 1 of 1

It is certified that error appears in the above-identified patent and that said Letters Patent is hereby corrected as shown below:

In the Claims

Column 22, Line 6, Claim 1, insert --;-- after the word "planes"

Column 24, Line 23, Claim 15, insert --continuing operation to determine whether an object is detected,-- before "continuing operation unchanged if no object is detected,"

Signed and Sealed this
Fifth Day of August, 2025

Coke Morgan Stewart
*Acting Director of the United States Patent and Trademark Office*